United States Patent [19]

Speier et al.

[11] 4,419,060

[45] Dec. 6, 1983

[54] APPARATUS FOR RAPIDLY FREEZING MOLTEN METALS AND METALLOIDS IN PARTICULATE FORM

[75] Inventors: John L. Speier; Donald T. Liles, both of Midland, Mich.

[73] Assignee: Dow Corning Corporation, Midland, Mich.

[21] Appl. No.: 474,780

[22] Filed: Mar. 14, 1983

[51] Int. Cl.³ .............................................. B01J 2/14
[52] U.S. Cl. ........................................... 425/8; 264/8
[58] Field of Search ................................. 425/8; 264/8

[56] References Cited

U.S. PATENT DOCUMENTS

| | | | |
|---|---|---|---|
| 2,356,599 | 8/1944 | Landgraf | 425/8 |
| 2,880,456 | 4/1959 | Kuzela et al. | 425/8 |
| 3,059,455 | 10/1962 | McNally | 425/8 |
| 3,358,323 | 12/1967 | Chisholm | 425/8 |
| 4,053,264 | 11/1977 | King | 425/8 |
| 4,078,873 | 3/1978 | Holiday et al. | 425/8 |
| 4,347,199 | 8/1982 | Speier et al. | 425/8 |

Primary Examiner—James R. Hall
Attorney, Agent, or Firm—Howard W. Hermann

[57] ABSTRACT

Described is an apparatus for freezing molten metals and metalloids in particulate or flake form at very rapid cooling rates. A volatile coolant liquid is fed to the center of a rapidly rotating disc-like member to create an outwardly flowing film of coolant across the surface of the member. The material to be processed is fed in molten form to the coolant film coaxially with the coolant, and is thrown outwardly by centrifugal forces while being cooled by vaporization of the liquid. The rotating member may include upwardly projecting vanes for collision with the outwardly flowing material to produce a higher surface area product and a cover over a portion of its top surface to confine the materials passing through the vanes.

6 Claims, 4 Drawing Figures

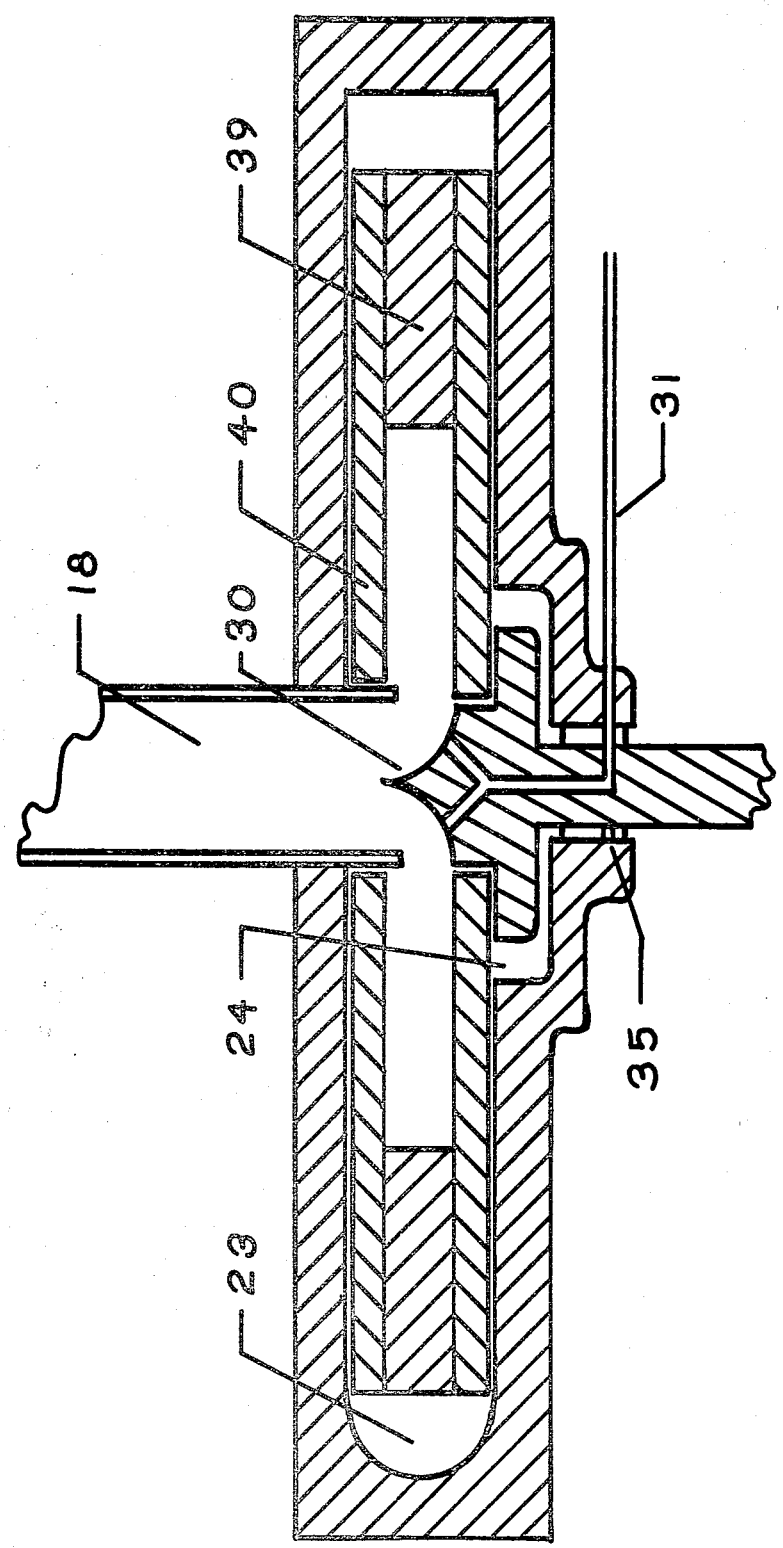

APPARATUS FOR RAPIDLY FREEZING MOLTEN METALS AND METALLOIDS IN PARTICULATE FORM

BACKGROUND OF THE INVENTION

The present invention relates to improvements in forming of particulates of metals, metalloids and alloys.

For many applications it is necessary that metals, including metallic alloys, and metalloids such as silicon and its alloys be provided in particulate form. Many systems have been devised for doing this. Among these are centrifugal atomizers which exist in various forms. In one form of centrifugal atomizers the material to be atomized is fed onto the surface of a rotating disc-like member which may be dished or flat. In one form of such systems, a gas is used to cool the particles thrown off the rotating member by centrifugal forces. Representative of this type of system are U.S. Pat. Nos. 2,752,196, 4,053,264 and 4,078,873. Other systems rely on contact of molten droplets with a cooled surface.

The prior art systems known to applicants suffer from several disadvantages, especially when the metals or metalloids being processed have a high melting point. One disadvantage when gases are used for cooling is the volume of gas which must pass through the system to provide sufficient cooling capacity for solidification of the particles. Another disadvantage lies in the need for materials of construction of the apparatus which will withstand the temperatures encountered.

Additionally it has been discovered that properties of some alloys are altered by the speed with which the materials are cooled from the molten state. It is known that rapid cooling can be used to make amorphous alloys or metallic glasses. Some of the metallic glasses have been shown to exhibit properties which are quite different from the same materials in the crystalline state. A discussion of these materials is given in an article entitled "Metallic Glasses" by John J. Gilman, appearing in *Science*, volume 208, 23 May 1980 at pages 856–861, and in an article of the same title by P. Chaudhari, B. C. Giessen and D. Turnbull appearing in *Scientific American*, Volume 242, (No. 4), April 1980 at pages 98–118.

In U.S. Pat. No. 4,377,199 granted Aug. 31, 1982 to Speier (one of the named inventors herein) and Gentle there is described a method and apparatus which provide a centrifugal atomizer making use of the heat of vaporization of liquid coolant and which thereby provides a system which offers rapid cooling with the temperature of most components under equilibrium conditions at or near boiling point of the coolant liquid used.

More specifically, the invention described in the patent comprises rotating a horizontally mounted disc-like member at high speed, introducing a stream of volatile liquid coolant at the center to provide an outwardly flowing film of coolant over substantially the entire upper surface of the rotating member and introducing the material to be atomized into the coolant film at a point spaced from the center. The molten material and the rotating member are cooled by evaporation of coolant, and particles are thrown from the device by centrifugal force. A modification of the rotating member described in the patent provides upwardly projecting vanes around the periphery of the rotating member which collide with the particles causing them to be flattened and resulting in a high surface area particulate.

While the above-described patented invention serves to produce a desirable particulate material for some applications a relatively broad range of particulate size is produced. It is desirable for some applications to produce a larger percentage of relatively finer particulate product, i.e., less than 325 U.S. Standard Mesh screen size. Additionally it was found that there was some degree of splashing of the metal or metalloid upwardly from the rotating disc-like member onto the housing of the unit, necessitating periodic cleaning of the housing.

SUMMARY OF THE INVENTION

It is accordingly an object of the present invention to produce a more uniform particulate from metals or metalloids.

A further object is to produce particulate metals and metalloids with a minimum of equipment maintenance.

In accordance with these and other objects there is provided by the present invention a modification of the centrifugal particulate-forming apparatus described in U.S. Pat. No. 4,347,199. It has been found that the provision of a generally conically shaped protrusion axially located on the rotating disc-like member and the dropping of the molten metal or metalloid on the apex of such protrusion with the coolant liquid introduced to the disc-like member in close proximity to its axis produces the desired more uniform size distribution of the particulate product. Further, the design of the unit is simplified by allowing both the coolant liquid and molten material to be processed to enter the housing through a single tube axially located relative to the rotating disc-like member.

A further improvement in the above-described patented centrifugal particulate forming apparatus is provided according to the present invention by a cover affixed to and placed over at least a portion of the disc-like member. The cover serves to prevent upward splashing of material from the rotating disc and further confines the radially outflowing coolant and cooling metalloid to force contact between the material being processed and the vanes which are provided to collide with the outwardly moving material. This additional feature serves to reduce the need for dismantling the unit for cleaning of the housing and appears to aid in producing uniform particulate product.

BRIEF DESCRIPTION OF DRAWINGS

The invention will become better understood to those skilled in the art from a consideration of the following Description of Preferred Embodiments when read in connection with the accompanying drawings wherein:

FIG. 4 is a fragmentary cross-sectional view of a modified form of the invention shown in FIGS. 1–3.

DESCRIPTION OF PREFERRED EMBODIMENTS

Figure 1:
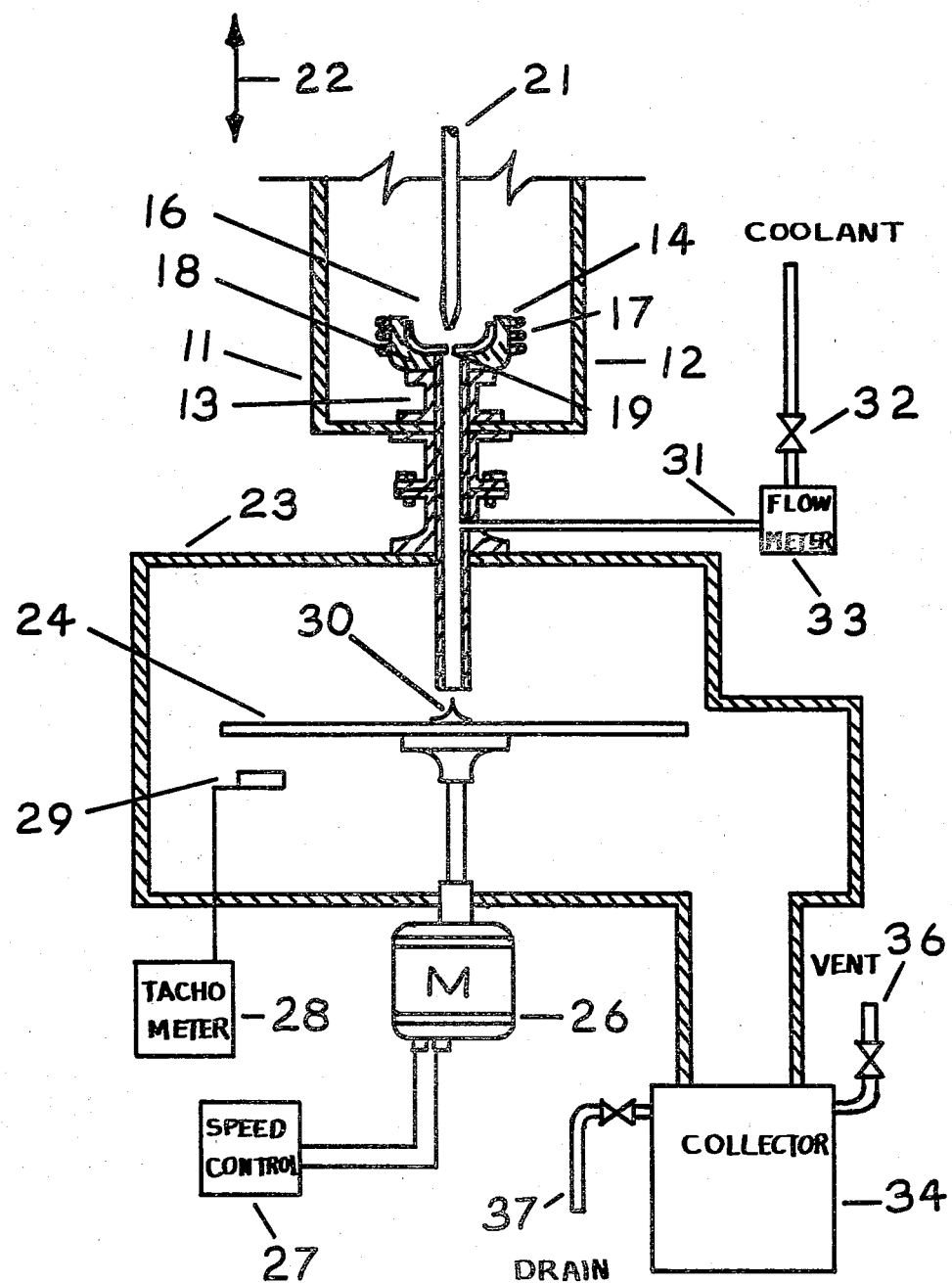
FIG. 1 is a diagrammatic view of a preferred embodiment of the invention.

Referring now to the drawings in FIG. 1 there is shown diagrammatically an apparatus for atomizing metals and metalloids in accordance with the present invention. At the top of the figure there is shown generally by the arrow 11 means for heating the material until it is molten. The means 11 is a closed chamber 12 having mounted on a pedestal 13 a susceptor 14 containing a crucible 16. An induction heating coil 17 energized by a suitable electric power source is utilized to heat the contents of the crucible. The susceptor 14 is preferably made of graphite and the crucible 16 should be essentially non-reactive with the material to be melted. In the instance of silicon as the material being processed the crucible is desirably made of quartz, graphite or graphite coated with silicon carbide.

Extending from the bottom of the crucible 16 through the susceptor 14 and pedestal 13 is a tube 18 which in the instance of silicon as the material being processed can also be made of quartz. In the bottom of the crucible 16 and coaxially located with respect to the tube 18 there is provided a tap hole 19 for allowing molten material to flow from the crucible into the center of tube 18. The flow through the tap hole 19 is controlled by means of a tapered plug 21 which may be raised and lowered as shown by the arrow 22 to plug or open the hole 19 and thereby act as a valve.

Mounted horizontally in a housing 23 below the heating means 11 is a disc-like member 24 mounted coaxial with the tube 18 for rotation by suitable means such as a variable speed motor 26 controlled by a speed control unit 27. In actual practice the chamber formed by the housing 23 of the system conforms relatively closely in size to the disc 24, but has been expanded in the drawing to allow easier understanding of the system. While the disc-like member shown has a planar upper surface it is to be understood that it may be dished or cup-shaped without departing from the nature of the invention. Desirably, speed is monitored by means of a tachometer 28 having a sensor 29 located to detect rotational speed. If desired, automatic conventional means may be utilized to feed back tachometer signals to the speed controller so that a preset speed can be maintained. At the center of the disc-like member 24 there is provided a generally conically shaped protrusion 30 having its apex located directly under the tap hole 19 of the crucible. While the protrusion is shown as concavely curved generally conical surface it is to be understood that some variation from the illustrated shape will still allow practice of the invention.

Also feeding into the tube 18 may be a coolant inlet tube 31 and flow control means which desirably include a valve 32 and flowmeter 33. In operation, a volatile liquid coolant is supplied by tube 31 to the tube 18, drops to a location close to center 30 to form an outwardly flowing coolant film across the surfaces of the rotating member. Molten material to be processed is flowed through inlet tube 18 onto the apex of the protrusion 30 and is dispersed by the apex thereof into the coolant film causing heat to be absorbed by evaporation of the volatile fluid. The coolant also serves to cool the protrusion 30. Centrifugal forces meanwhile act to further disperse the work material as it is being cooled and the material is thrown from the periphery of the disc and collected in a suitable collector 34. To provide for expansion of the evaporating fluid a vent 36 is provided from the collector and a suitable drain 37 may be provided for removal of any excess cooling liquid. If desired, the entire system can be operated in an inert atmosphere and a single chamber can encompass the entire system except for the controls, to permit safe use of combustible or toxic coolants.

An alternative method of feeding coolant is illustrated in FIG. 4. Coolant inlet 31 may be attached to a annular cavity 35 in the bearing for the assembly to enter a hole in the drive shaft to cool protrusion 30 as it flows thru ducts in 30 to flow across the surfaces of the rotating member.

Figure 2:
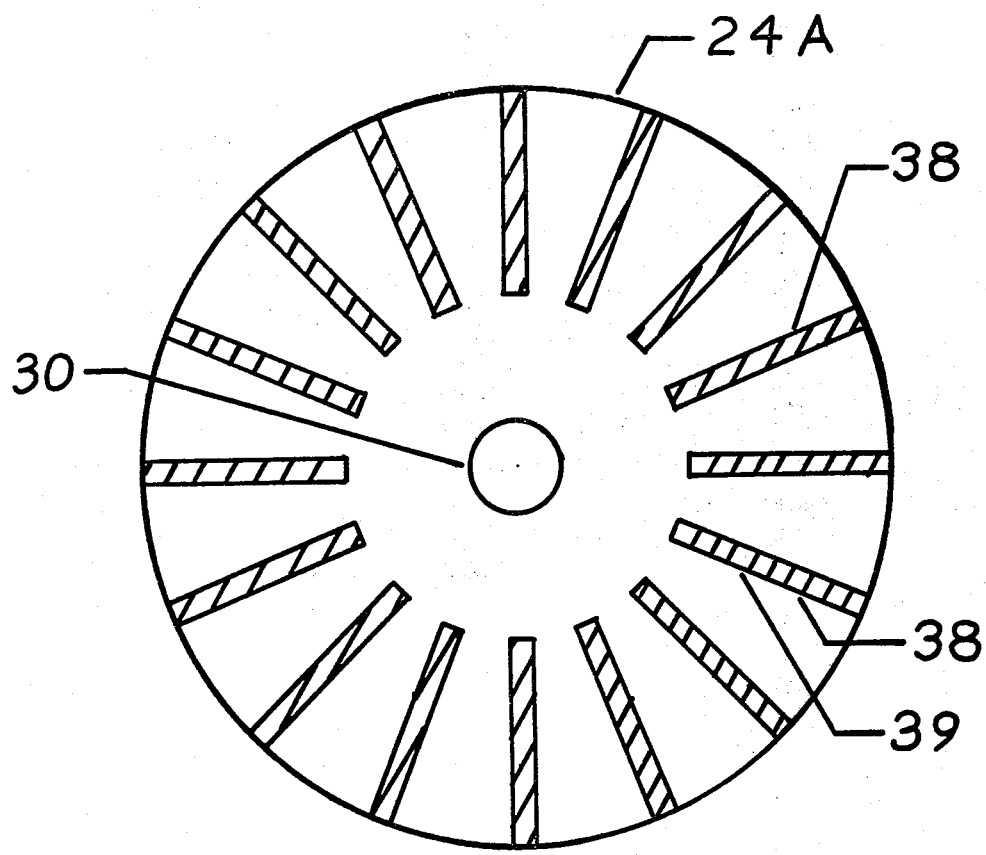
FIG. 2 is a horizontal cross sectional view taken on a line 2—2 of FIG. 3 of a modified embodiment of the rotatable disc-like member included in FIG. 1.
Figure 3:
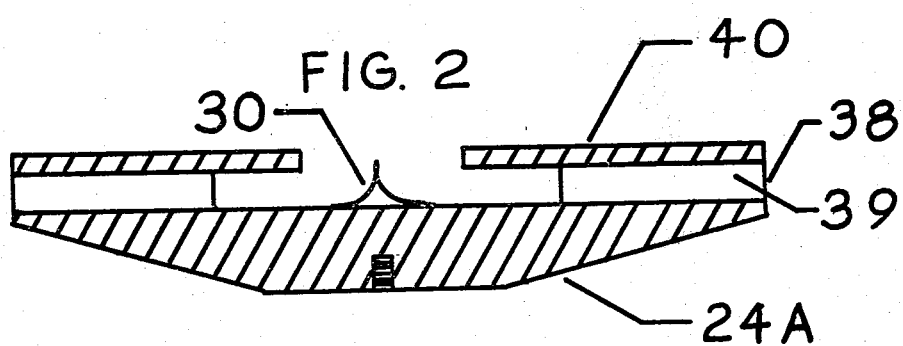
FIG. 3 is a cross-sectional view of the embodiment of FIG. 2 taken on the line 3—3 of FIG. 2.

When the system is properly controlled the atomized product tends to be made up essentially of round particles. If a greater surface area or flake-like product is desired a modified disc-like member 24A such as that shown in FIGS. 2, 3 and 4 can be employed. The device shown in these Figures has a plurality of vanes 38 positioned around the periphery of the disc-like member and protruding upwardly above its primary surface. It is also provided, as can be seen from FIGS. 3 and 4 with a disc-like cover 40 having a hole in its center to allow material in process and, if desired, coolant liquid to reach the primary surface of the disc-like member. In a preferred embodiment each vane has an essentially vertical planar surface 39 positioned radially with respect to the center of rotation of the disc-like member.

In operation of the system with the modified disc-like member 24A the vanes 38 collide with the liquids moving radially outwardly across the upper surface of the rotating member 24A and form films which solidify in the form of foils or flakes as the material moves outwardly and is eventually thrown from the periphery. The cover 40 serves to confine the outwardly flowing material to prevent upward splashing thereof, further insures contact of the work material with the vanes and provides an additional impact surface for breaking up of particles.

The theory of operation of the device can be better understood by realizing that (1) the specific heat of gases is typically 0.26 to 0.4 Calorie per degree Celsius per gram, (2) the specific heat of liquids is typically 0.5 to 1.0 Calorie per degree Celsius per gram, but (3) the heat of vaporization of liquids is about 540 Calories per gram for water, 327 Calories per gram for ammonia, 92 calories per gram for butane and 81 calories per gram for hexane. Thus the evaporation of one gram of the liquids named absorbs up to 1080 times as much heat as a gram of gas and up to 540 times as much heat as any named liquid. When heat is absorbed by evaporation of a liquid the temperature of the system becomes the boiling point of the liquid as long as any liquid remains. Thus, no need exists for high temperature capability for materials of construction of the atomizer. If water is used as coolant temperatures will not substantially exceed 100° C.; with hexane maximum temperature is only about 69° C.

A sample calculation of the relative coolant requirements using gas, liquid, and heat of vaporization of liquid for cooling a 28 gram sample of molten silicon is as follows:

(In these calculations:
 $\Delta H_f$ = heat of fusion of metal
 $C_p$ = specific heat
 $\Delta T$ = temperature change
 $\Delta H_v$ = heat of vaporization).

To cool 28 grams silicon from 1500° C. to 100° C.:
 $\Delta H_f$ = 11,100 cal/28 grams
 $C_p \times \Delta T$ = 4.95 cal/°C./28 g × 1400° C. = 6,930 cal
 Total calories to be lost from 28 g of Si = 18,030 calories (A) In a gas atomizer using $N_2$ at 25° C.
 $C_p \times \Delta T$ = 0.25 cal/°C./g × 75° C. = 18.75 cal/gm
 18,030 cal/18.75 cal/g = 962 g of $N_2$ needed (B) In a liquid non-evaporative system using $H_2O$ at 25° C.

$C_p \times \Delta T = 1$ cal/°C./g $\times 75$° C. $= 75$ cal/gm 18,030 cal/75 cal/g $= 240$ g of $H_2O$ needed (C) In the evaporative system of this invention using $H_2O$ at 25° C.

$\Delta H_v = 540$ cal/°C./g $C_p = 1$ cal/°C./g 540 cal/g $\times$ Xg $+ 1$ cal/°C./g $\times 75$° C. $\times$ Xg $= 18,030$ cal Xg $= 29.3$ g of water needed.

Metallurgical grade silicon was processed using de-ionized water as a coolant in a unit made in accordance with the present invention running at 12,000 revolutions per minute (rpm) and in a similar unit run at 12,000 rpm and made in accordance with the description furnished in U.S. Pat. No. 4,347,199. Resultant particulate material was of particle size as follows:

| | Percent by Weight | |
| --- | --- | --- |
| U.S. Standard Mesh | Patent 4,347,199 | Present Invention at 12,000 rpm |
| 60–100 | 10.8 | 4.1 |
| 100–200 | 20.5 | 10.6 |
| 200–325 | 23.9 | 11.7 |
| 325 | 45.5 | 73.4 |

Obviously variations and modifications of the invention as described herein will become apparent to those skilled in the art. It is to be understood, therefore, that within the scope of the appended claims the invention may be practiced other than as specifically described.

That which is claimed is:

1. In an apparatus for rapid freezing of metals and metalloids in particulate form from a melt of such materials having a disc-like member mounted substantially horizontally on a centrally located shaft connected to a high rotatable speed power source and inlet means for introducing both a volatile liquid coolant and the molten material to be processed to the disc-like member as it is rotated whereby the molten material is cooled to the solid state by vaporization of the liquid coolant and dispersed by centrifugal forces acting upon the coolant and material, the improvement which comprises:

a generally cone-shaped protrusion located with its apex extending upwardly from the center of rotation of the disc-like member, the inlet means for the molten materials being located vertically above the apex of the protrusion, and the inlet means for said liquid coolant being located sufficiently close to said inlet means for said molten materials to provide cooling for said protrusion and to provide an outwardly flowing film of coolant liquid across the upwardly facing surface of said disc-like member, whereby the molten material dropped to the apex of said protrusion is dispersed thereby into said film of coolant liquid.

2. The improvement as defined in claim 1 wherein the conical surface of said protrusion is concavely curved.

3. The improvement defined in claim 1 wherein the disc-like member has around its peripheral portion a plurality of vanes protruding above its primary upper surface whereby the outwardly flowing material collides with the vanes.

4. The improvement as defined in claim 3 wherein the conical surface of said protrusion is concavely curved.

5. The improvement as defined in claim 3 wherein the upper surfaces of the vanes are at least partially enclosed by a flat circular cover having a concentric opening therein for inlet of said molten material and coolant.

6. The improvement as defined in claim 5 wherein the conical surface of said protrusion is concavely curved.

* * * * *